US008800948B2

(12) United States Patent
Wakayama et al.

(10) Patent No.: US 8,800,948 B2
(45) Date of Patent: Aug. 12, 2014

(54) SEAT SLIDE LOCKING APPARATUS

(75) Inventors: Hiroyuki Wakayama, Aki-gun (JP); Yasuhito Domoto, Aiki-gun (JP)

(73) Assignee: Delta Kogyo Co., Ltd. (JP)

( * ) Notice: Subject to any disclaimer, the term of this patent is extended or adjusted under 35 U.S.C. 154(b) by 103 days.

(21) Appl. No.: 13/071,767

(22) Filed: Mar. 25, 2011

(65) Prior Publication Data

US 2011/0233370 A1 Sep. 29, 2011

(30) Foreign Application Priority Data

Mar. 29, 2010 (JP) ................................. 2010-074404

(51) Int. Cl.
*B60N 2/08* (2006.01)

(52) U.S. Cl.
USPC ..... 248/429; 248/423; 297/344.1; 296/65.13; 74/526

(58) Field of Classification Search
CPC .................................... B60N 2/07; B60N 2/08
USPC ................. 248/408, 429, 419, 423, 424, 430; 74/526, 529; 297/344.1; 296/65.13
See application file for complete search history.

(56) References Cited

U.S. PATENT DOCUMENTS

| 5,596,910 | A | | 1/1997 | Bauer et al. | |
| 5,782,138 | A | | 7/1998 | Groche | |
| 5,816,110 | A | | 10/1998 | Schuler et al. | |
| 5,913,947 | A | * | 6/1999 | Groche | 74/527 |
| 5,918,846 | A | * | 7/1999 | Garrido | 248/429 |
| 6,637,712 | B1 | | 10/2003 | Lagerweij | |
| 6,764,054 | B2 | * | 7/2004 | Becker et al. | 248/429 |
| 7,082,854 | B2 | * | 8/2006 | Goodbred et al. | 74/527 |
| 7,600,816 | B2 | * | 10/2009 | Bauersachs et al. | 297/341 |
| 7,722,006 | B2 | * | 5/2010 | Beneker et al. | 248/424 |
| 7,980,525 | B2 | * | 7/2011 | Kostin | 248/429 |
| 8,029,063 | B2 | * | 10/2011 | Kazyak et al. | 297/344.1 |
| 8,382,057 | B2 | * | 2/2013 | Napau et al. | 248/423 |
| 8,387,936 | B2 | * | 3/2013 | Tarusawa et al. | 248/429 |
| 8,550,420 | B2 | * | 10/2013 | Wojatzki et al. | 248/429 |

(Continued)

FOREIGN PATENT DOCUMENTS

| JP | 47-39764 | 12/1972 |
| JP | 10500647 | 1/1998 |
| WO | 2005021319 A2 | 3/2005 |

OTHER PUBLICATIONS

European Search Report, Jul. 2012.

*Primary Examiner* — Terrell McKinnon
*Assistant Examiner* — Eret McNichols
(74) *Attorney, Agent, or Firm* — Gerald E. Hespos; Michael J. Porco; Matthew T. Hespos

(57) ABSTRACT

A slide locking apparatus for a seat includes a first locking section with plural first locking pieces and at least one second locking section group with forward, intermediate, and rear second locking sections. When at least one of the first locking pieces locks with one of the second locking sections, another first locking piece locks with another second locking section. A first lock inhibiting section inhibits the forward second locking section from engaging any of the locking pieces when a rearwardmost locking piece is forward of a position where the rearwardmost locking piece coincides with the intermediate locking section. A second inhibiting section inhibits the rear second locking section from locking with any of the locking pieces when the forward locking piece is rearward of the intermediate locking section.

3 Claims, 16 Drawing Sheets

(56) References Cited

U.S. PATENT DOCUMENTS

| | | | |
|---|---|---|---|
| 2003/0164434 A1* | 9/2003 | Frohnhaus et al. | 248/430 |
| 2004/0026975 A1* | 2/2004 | Rausch et al. | 297/344.1 |
| 2007/0095596 A1* | 5/2007 | Beneker et al. | 180/326 |
| 2008/0163717 A1 | 7/2008 | Weber | |
| 2008/0315662 A1* | 12/2008 | Suck et al. | 297/463.1 |
| 2009/0114793 A1* | 5/2009 | Brewer et al. | 248/429 |
| 2010/0102192 A1* | 4/2010 | Tarusawa et al. | 248/429 |
| 2012/0294674 A1* | 11/2012 | Lee et al. | 403/322.4 |

* cited by examiner

SEAT SLIDE LOCKING APPARATUS

BACKGROUND OF THE INVENTION

1. Field of the Invention

The present invention relates to a slide locking apparatus for a seat of an automobile, or the like.

2. Description of the Related Art

In the prior art, a slide locking apparatus for an automobile seat is known, as disclosed in Japanese Utility Model Application Publication No. 47-39764, for example. The slide locking apparatus disclosed in this Japanese Utility Model Application Publication No. 47-39764 comprises a lower rail which is fixed to the floor of the automobile and an upper rail which is attached in a fixed fashion to a seat. The lower rail has a plurality of second locking portions (recesses) which are aligned in a direction following the lengthwise direction of the rail (the front/rear direction of the automobile). The upper rail has one locking piece (for example, a locking hook) as a first locking part which interlocks with a second locking portion. A locked state is achieved when the locking piece is inserted into any one of the second locking portions. In this locked state, the seat is fixed in a suitable front/rear position.

In a configuration which locks by interlocking one locking piece into one second locking portion, as in the slide locking apparatus disclosed in Utility Model No. S47-39764, the force applied to the seat is applied to the abutting portion between the locking piece and the inner wall of the second locking portion (in other words, to one location). Consequently, the locking strength between the locking piece and the second locking portion may be affected.

On the other hand, it is expected that the locking strength can be improved by adopting a composition in which a plurality of locking pieces aligned in the front/rear direction are provided on a seat, for example, and this plurality of locking pieces are inserted simultaneously into a plurality of second locking portions.

However, even with a configuration of this kind, the locking strength between the locking pieces and the second locking portions may be affected. For example, as shown in FIG. 17, if the seat is moved forwards (in the X direction in FIG. 17) and the rearmost locking piece 100a of the locking pieces 100a to 100e is inserted into the forwardmost second locking portion 102a of the second locking portions 102 of the lower rail 101, then only the rearmost locking piece 100a is inserted into the forwardmost second locking portion 102. In cases such as this, force is applied to the abutting portion between the locking piece 100a and the inner wall of the second locking portion 102a (in other words, in one location). Therefore, similarly to a configuration where only one locking piece is provided as described above, the locking strength between the locking piece and the second locking portion may be affected.

SUMMARY OF THE INVENTION

It is an object of the present invention to provide a slide locking apparatus for a seat having increased locking strength of a locking piece with respect to a second locking portion.

According to the slide locking apparatus for a seat relating to one aspect of the present invention, a slide locking apparatus for a seat has: a first locking section provided on one of a lower rail and an upper rail which can be moved in a front/rear direction following a lengthwise direction of the lower rail; and a plurality of second locking sections, which are provided on the other one of the lower rail and the upper rail, so as to be able to lock with and unlock from the first locking section. The first locking section has a plurality of locking pieces aligned in the lengthwise direction in one of the lower rail and the upper rail. The plurality of second locking sections are aligned in the lengthwise direction of the other of the lower rail and the upper rail and constitute at least one second locking section group. The second locking section group is configured such that, when at least one of the plurality of locking pieces locks with one of a forwardmost second locking section disposed in a forwardmost position, a rearwardmost second locking section disposed in a rearwardmost position, and an intermediate second locking section disposed between the forwardmost and rearwardmost second locking sections, in a substantially simultaneous fashion therewith, another locking piece of the plurality of locking pieces can lock with another second locking section of the second locking section group. The slide locking apparatus for a seat further has: at least one of a first lock inhibiting section which inhibits the forwardmost second locking section from locking with any of the locking pieces when the rearwardmost locking piece of the plurality of locking pieces has entered into a region forward of a lockable position where the rearwardmost locking piece coincides with an intermediate second locking section that is adjacent to the forwardmost second locking section of the second locking section group, and a second lock inhibiting section which inhibits the rearwardmost second locking section from locking with any of the locking pieces if the forwardmost locking piece of the locking pieces has entered into a region rearward of a lockable position where the forwardmost locking piece coincides with the intermediate second locking section that is adjacent to the rearwardmost second locking section of the second locking section group.

DETAILED DESCRIPTION OF THE PREFERRED EMBODIMENTS

Figure 1:
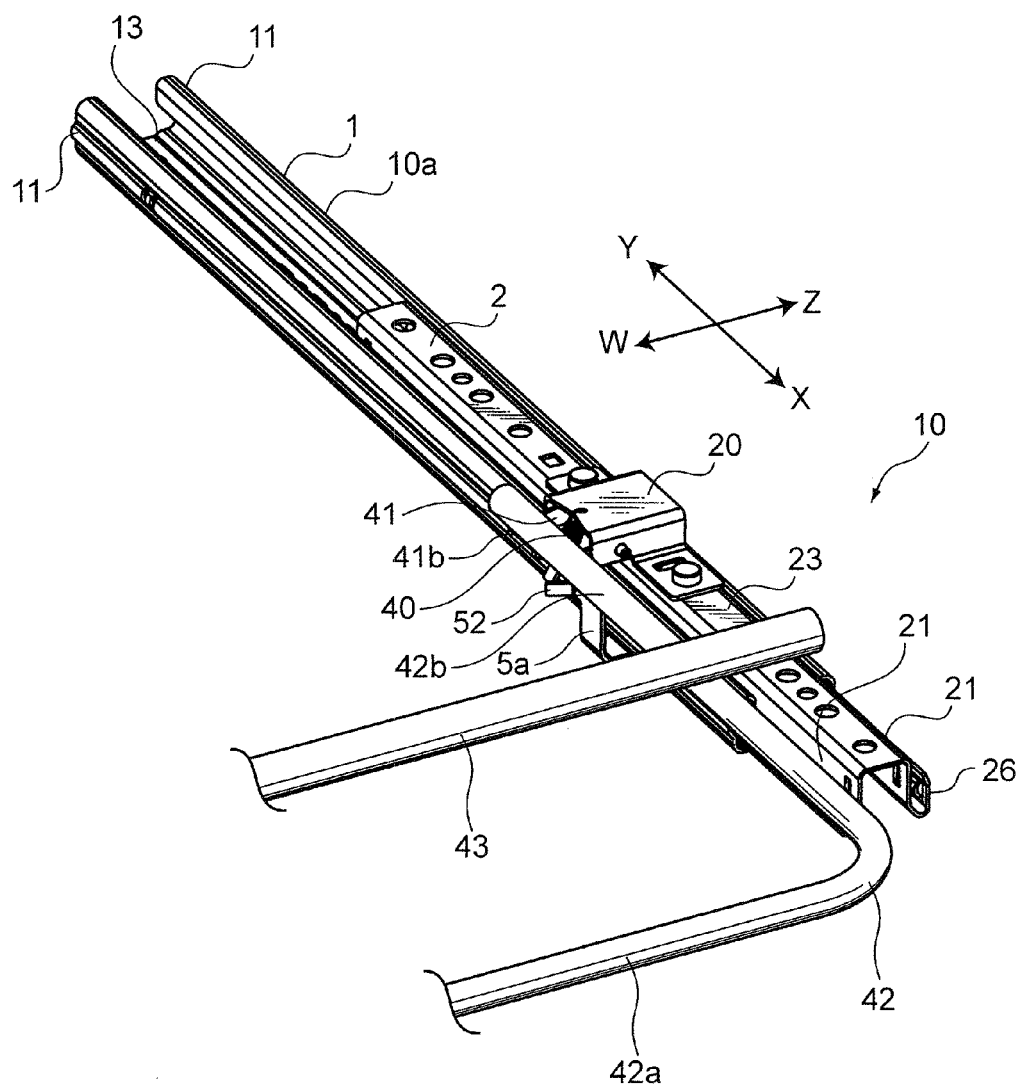
FIG. 1 is a perspective diagram of the left-hand part of a slide locking apparatus for an automobile seat relating to one embodiment of the present invention.
Figure 2:
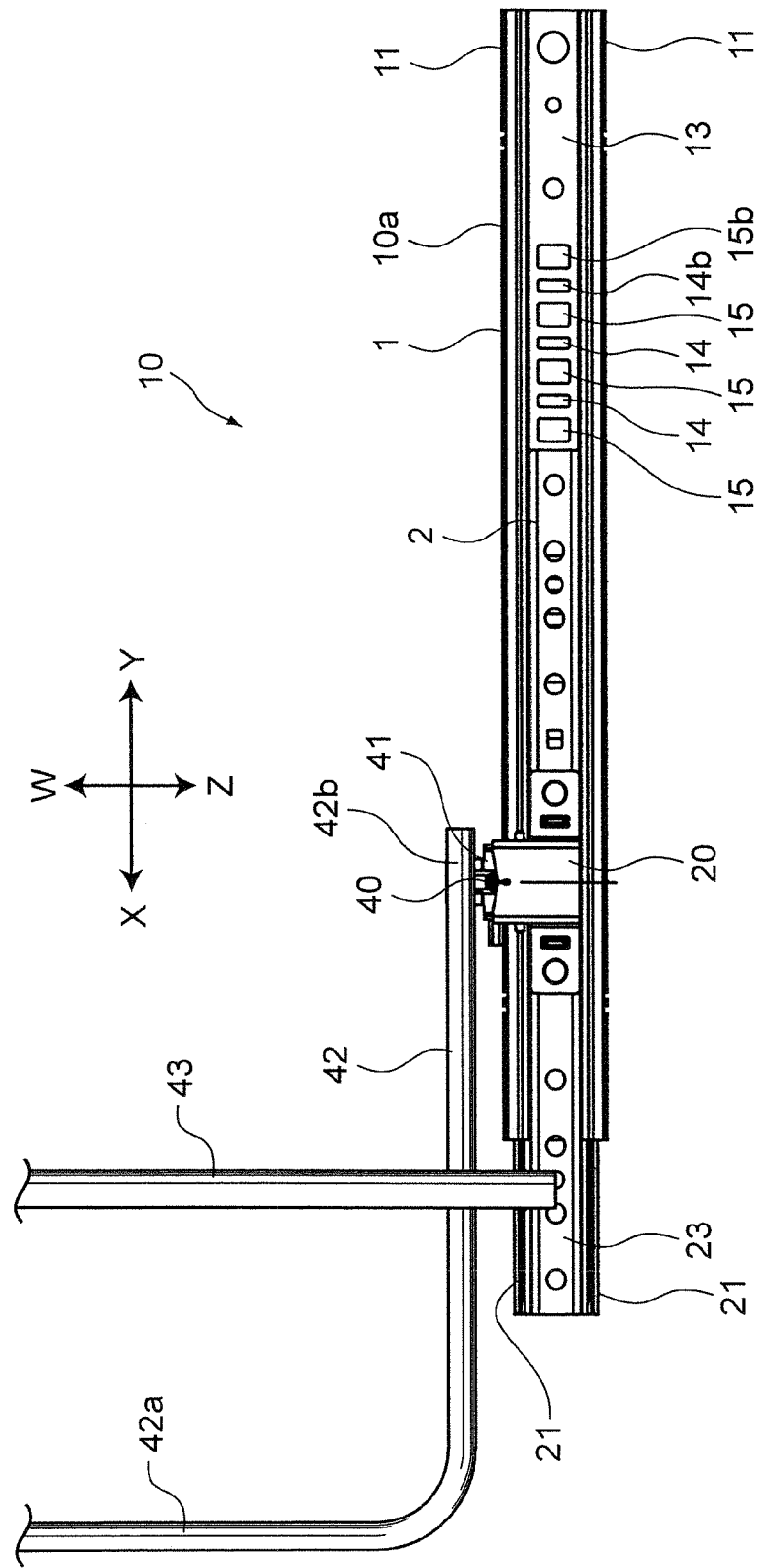
FIG. 2 is a plan diagram of the slide locking apparatus for an automobile seat in FIG. 1.
Figure 3:
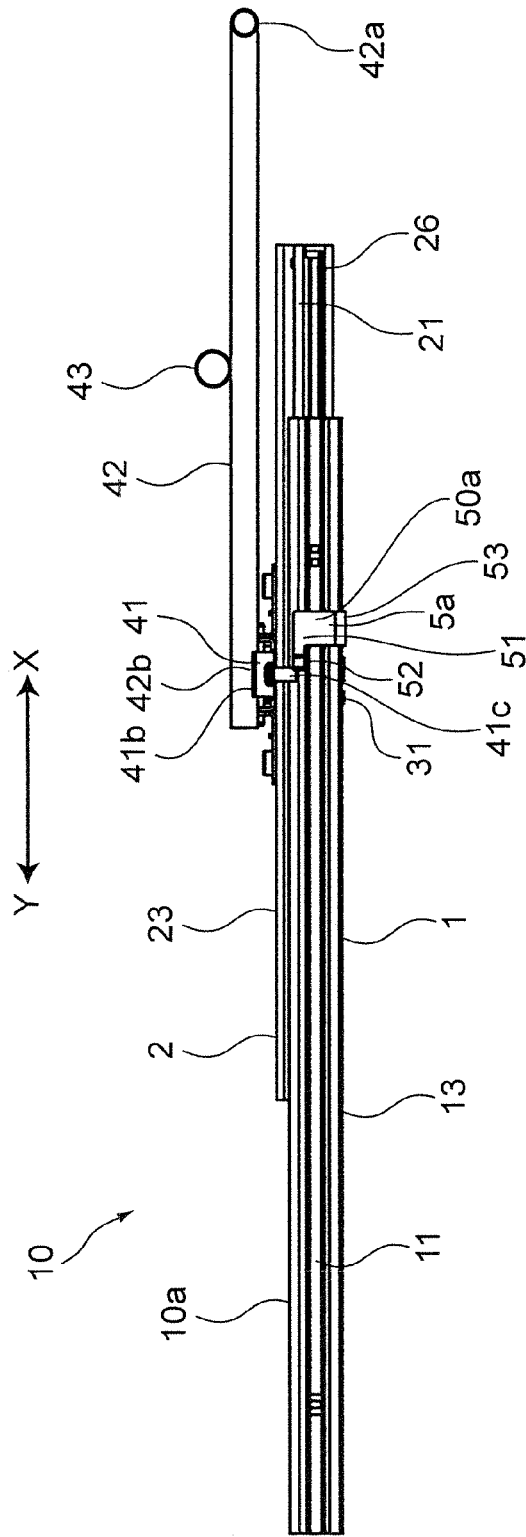
FIG. 3 is a right-side diagram of the slide locking apparatus for an automobile seat in FIG. 1.
Figure 4:
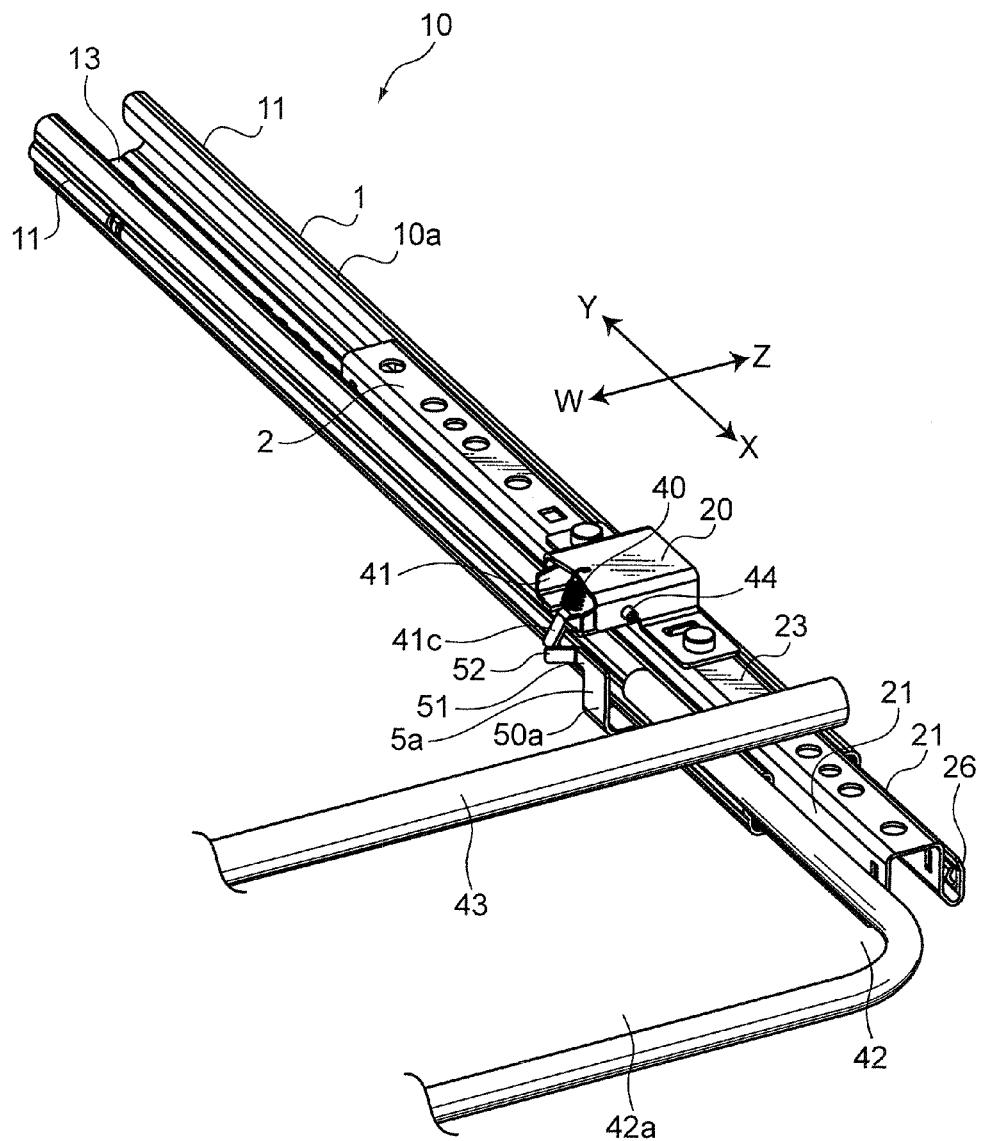
FIG. 4 is a perspective diagram showing the slide locking apparatus for an automobile seat in FIG. 1, omitting a portion of the operating body.
Figure 5:
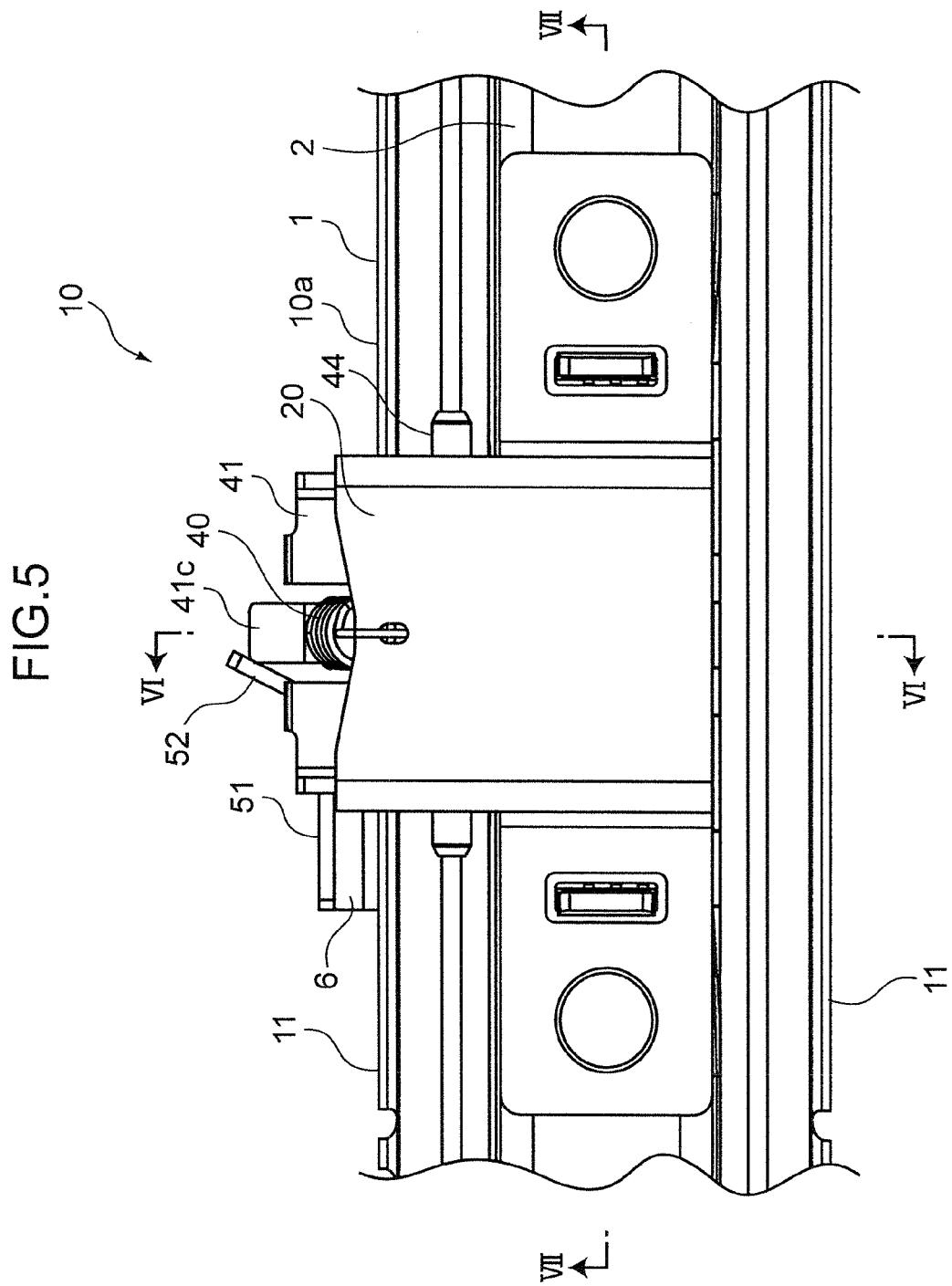
FIG. 5 is an enlarged plan diagram of the principal part of a slide locking apparatus for an automobile seat in FIG. 4.
Figure 6:
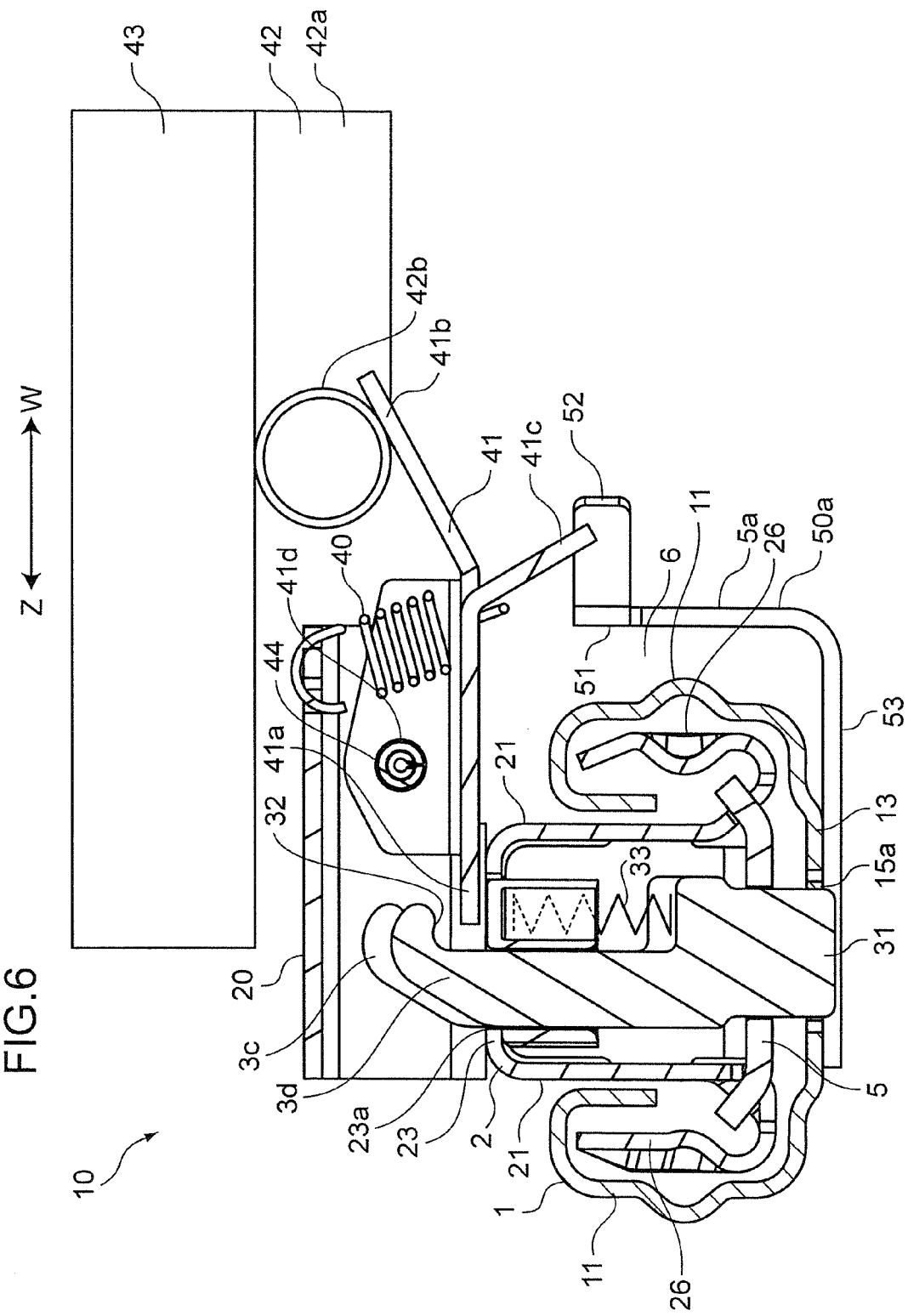
FIG. 6 is an enlarged cross-sectional diagram along line VI-VI in FIG. 5.
Figure 7:
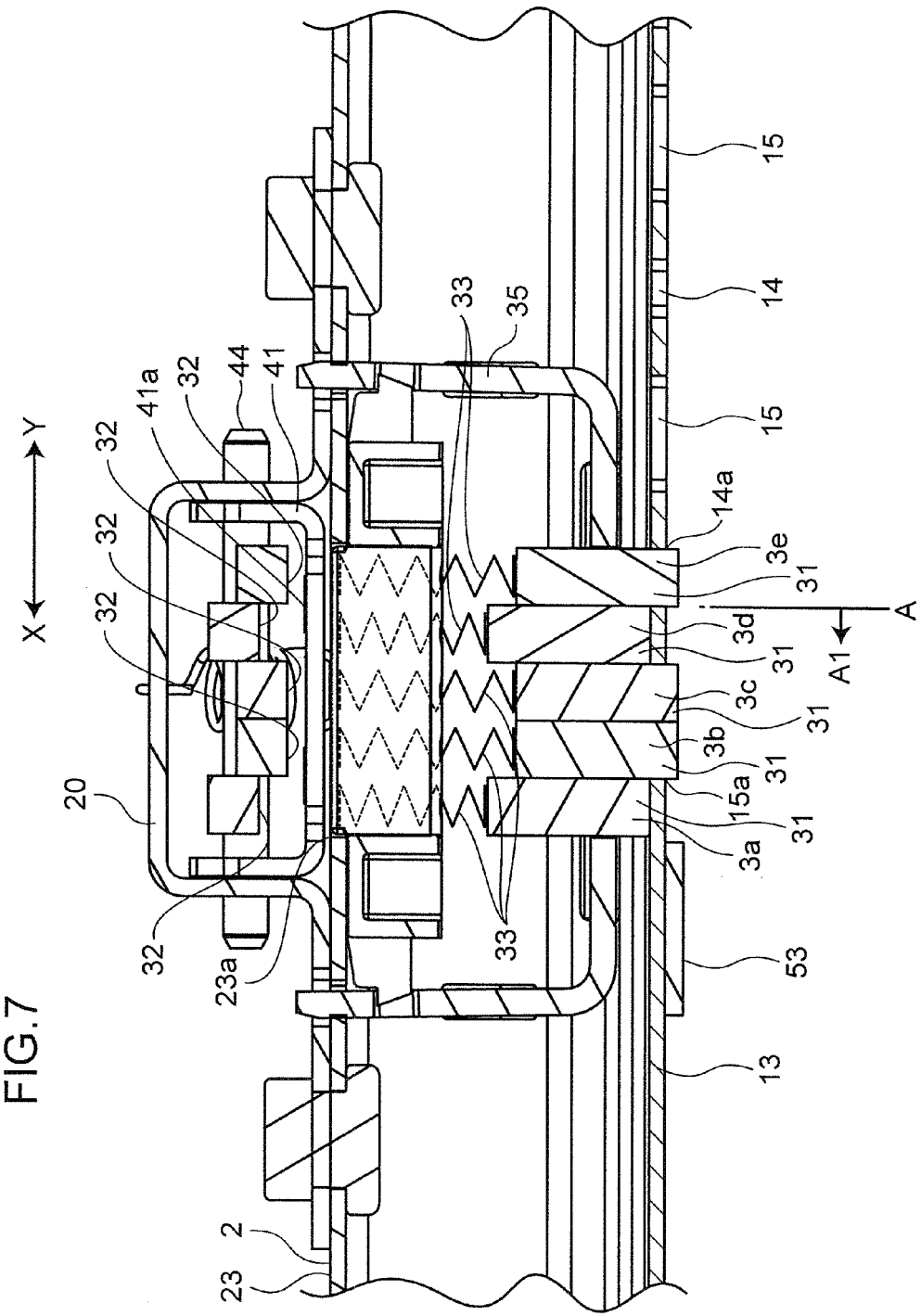
FIG. 7 is an enlarged cross-sectional diagram along line VII-VII in FIG. 5.

FIG. 1 is a perspective diagram of the left-hand part of a slide locking apparatus for an automobile seat according to one embodiment of the present invention. FIG. 2 is a plan diagram of the slide locking apparatus for an automobile seat in FIG. 1. FIG. 3 is a right-side diagram of the slide locking apparatus for an automobile seat in FIG. 1. FIG. 4 is a perspective diagram showing the slide locking apparatus for an automobile seat in FIG. 1, omitting a portion of the operating body. FIG. 5 is a plan diagram showing an enlarged view of the principal part of FIG. 4. FIG. 6 is a cross-sectional diagram along line VI-VI in FIG. 5. FIG. 7 is a cross-sectional diagram along line VII-VII in FIG. 5. In the description given below, the X direction in the drawings is the forward direction of the vehicle, the Y direction in the drawings is the rearward direction of the vehicle, the Z direction in the drawings is the leftward direction of the vehicle and the W direction in the drawings is the rightward direction of the vehicle.

The slide locking apparatus 10 for a seat according to the present embodiment suitably locks and unlocks sliding of the upper rail 2 with respect to the lower rail 1. The slide locking apparatus 10 according to the present embodiment is used to locking an automobile seat.

The slide locking apparatus 10 for an automobile seat according to this embodiment includes a left-hand sliding section 10a which is disposed on the lower left-hand side of the driver's seat, for example, a right-hand sliding section (not illustrated) which is disposed on the lower right-hand side of the driver's seat, a plurality of locking pieces 3a to 3e (see FIG. 7) which constitute a first locking section, unlock operating members 40, 41, 42, and a lock inhibiting section 5a.

The left-hand sliding section 10a and the right-hand sliding section are disposed so as to have left/right symmetry. Below the left-hand sliding section 10a is described and the description of the right-hand sliding section is omitted.

As shown in FIG. 1 to FIG. 7, the left-hand sliding section 10a includes a lower rail 1 and an upper rail 2.

The lower rail 1 is constituted by a long member, and this lower rail 1 is fixed to the floor of the automobile in such a manner that the lengthwise direction thereof is aligned with the front/rear direction of the automobile. As shown in FIG. 6, the lower rail 1 includes left and right-hand side walls 11, 11 arranged as opposed to each other at a distance apart in the left/right direction, and a bottom wall 13 which connects together the lower ends (base ends) of the side walls 11, 11.

A plurality of second locking sections are provided in the bottom wall 13, and this plurality of second locking sections are composed by square-shaped locking holes 14 to 15b into which the locking pieces 3a to 3e can be inserted, as shown in FIG. 2 and FIG. 7. In the present embodiment, there are two types of locking hole. More specifically, there are a plurality of small locking holes 14, 14a, 14b and a plurality of large locking holes 15, 15a, 15b, and these small locking holes and large locking holes have different lengths in the front/rear direction.

The small locking holes 14, 14a, 14b and the large locking holes 15, 15a, 15b are holes which pass through the bottom wall 13 from the upper surface to the lower surface thereof.

The length of the small locking holes 14, 14a, 14b in the front/rear direction and the length thereof in the left/right direction (width) are substantially the same respectively as the length of locking hook sections 31 of the respective locking pieces 3a to 3e (described hereinafter) in the front/rear direction and the length thereof in the left/right direction (width). The locking hook sections 31 of the locking pieces 3a to 3e can be inserted into and removed from each of the small locking holes 14, 14a and 14b.

The length of the large locking holes 15, 15a, 15b in the left/right direction (width) is substantially the same as that of the small locking holes 14, 14a, 14b, and the length of the large locking holes 15, 15a, 15b in the front/rear direction is approximately two times the length of the small locking holes 14, 14a, 14b in the front/rear direction. In other words, the length of the large locking holes 15, 15a, 15b in the front/rear direction is approximately two times the length in the front/rear direction of the locking hook sections 31 of the locking pieces 3a to 3e described below. Consequently, it is possible for the locking hook sections 31 of two locking pieces 3a to 3e to be inserted into and removed from each of the large locking holes 15, 15a, 15b.

The small locking holes 14, 14a, 14b and the large locking holes 15, 15a, 15b are aligned alternately in the lengthwise direction of the bottom wall 13. The distance between the mutually adjacent small locking holes 14, 14a, 14b and large locking holes 15, 15a, 15b is substantially the same as or slightly larger than the length of the small locking holes 14, 14a, 14b in the front/rear direction.

In the present embodiment, as shown in FIG. 7, the forwardmost locking hole 15a which constitutes the forwardmost second locking section which is disposed in the forwardmost position is formed by a large locking hole, and furthermore, as shown in FIG. 2, the rearwardmost locking hole 15b of the rearwardmost second locking section which is disposed in the rearwardmost position is formed by a large locking hole.

The forwardmost locking hole 15a, the rearwardmost locking hole 15b and the intermediate locking holes 14 to 15, which are intermediate second locking sections disposed between the forwardmost and rearwardmost locking holes, constitute one second locking section group. In other words, in the present embodiment, the lower rail 1 includes one second locking section group.

The forwardmost locking hole 15a and the rearwardmost locking hole 15b are not limited to this mode. More specifically, one or both of the forwardmost locking hole 15a and the rearward most locking hole 15b may be constituted by one of the small locking holes 14, 14a, 14b.

The upper rail 2 is constituted by a long member having substantially the same length as the lower rail 1. The upper rail 2 is disposed in a fixed state on the automobile seat (not illustrated), and is also slidable in the lengthwise direction of the lower rail 1. By means of the upper rail 2 sliding with respect to the lower rail 1, the automobile seat moves in the front/rear direction of the vehicle.

As shown in FIG. 6, the upper rail 2 includes left and right-hand side walls 21, 21 arranged as opposed to each other at a distance apart in the left/right direction and an upper wall 23 which connects together the upper ends (based ends) of the side walls 21, 21.

In this embodiment, the left and right-hand side walls 21, 21 bend downwards from the left and right-hand ends of the upper wall 23, and the upper rail 2 includes a fold back piece 26 which is bent upwards on the outer side from the lower end (front end) of the side wall 21.

A locking piece insertion hole 23a into which the locking pieces 3a to 3e can be inserted in the vertical direction is provided in the upper wall 23.

Next, the configuration of the locking pieces 3a to 3e will be described.

In the present embodiment, the five locking pieces 3a to 3e have the same configuration, as shown in FIG. 7. The locking pieces 3a to 3e each include a locking hook section 31 which is inserted into and removed from the locking holes 14 to 15b of the lower rail 1, and an operated section 32 which is operated and pushed up by a locking piece operating member 41 of the unlock operating members 40, 41, 42 which are described below. The locking hook sections 31 are positioned to the lower side of the operated sections 32.

The locking hooks 3a to 3e composed in this way are movable in the vertical direction with respect to the upper rail 2. More specifically, the locking hooks 3a to 3e are aligned in one row in the front/rear direction with virtually no gaps therebetween, and are held by a holding member 35 so as to be able to maintain this posture. The locking pieces 3a to 3e held by the holding member 35 are each forced downwards by a coil spring 33 which constitutes a locking piece biasing member.

The holding member 35 which holds the locking pieces 3a to 3e is fixed to the upper rail 2. The operated sections 32 of the locking pieces 3a to 3e pass respectively through the locking piece insertion hole 23a of the upper rail 2 and project up above the upper wall 23 of the upper rail 2. The locking hook sections 31 of the locking pieces 3a to 3e are allowed to come in and out of the locking holes 14 to 15b in the lower rail 1.

Next, the unlock operating members 40, 41, 42 will be described.

The unlock operating members 40, 41 42 are members used in order to perform an unlocking operation of the locking pieces 3a to 3e, and as shown in FIG. 1 to FIG. 5, include a locking piece operating member 41 which pushes the locking pieces 3a to 3e up against the biasing force of the coil spring 33 described above, an operating member biasing spring 40 which urges the locking piece operating member 41, and an operating body 42 for operating the locking piece operating member 41.

Figure 8:
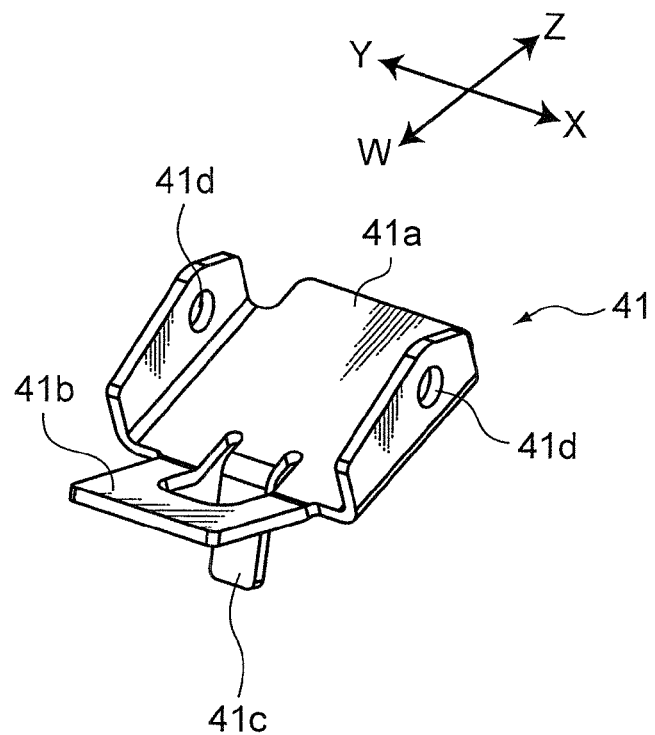
FIG. 8 is a perspective diagram of a locking piece operating member.

As shown in FIG. 8, the locking piece operating member 41 includes a locking piece pressing section 41a for pressing and operating the operated sections 32 of the locking pieces 3a to 3e, on the left-hand end thereof (on one end: the right-hand end in FIG. 8). The length of the locking piece pressing section 41a in the front/rear direction is slightly greater than the total length of the five locking pieces 3a to 3e in the front/rear direction, as shown in FIG. 7. Therefore, the locking piece pressing section 41a is able to press the five locking pieces 3a to 3e simultaneously.

Furthermore, as shown in FIG. 8, the locking piece operating member 41 includes a pressed operating section 41b and an engaging piece 41c on the right-hand end (the other end: the left-hand end in FIG. 8). The pressed operating section 41b is a portion which is pressed by the operating body 42. The engaging piece 41c is a portion which engages detachably with a first engaging section 51 in a first pressed state maintaining section 50a of a first lock inhibiting section 5a, which is described hereinafter.

The pressed operating section 41b and the engaging piece 41c are connected to the locking piece pressing section 41a. More specifically, the pressed operating section 41b and the engaging piece 41c are coordinated with the locking piece pressing section 41a. In the present embodiment, the locking piece pressing section 41a, the pressed operating section 41b and the engaging piece 41c are formed in an integrated fashion by a plate-shaped member. The engaging piece 41c extends diagonally downwards from the locking piece pressing section 41a which is formed in a horizontal shape.

The locking piece operating member 41 composed in this way is installed rotatably on the upper wall 23 of the upper rail 2 via an operating member supporting member 20.

More specifically, the operating member supporting member 20, which is arranged so as to cover the locking pieces 3a to 3e from above, is provided in a fixed fashion on the upper wall 23 of the upper rail 2. As shown in FIG. 6 and FIG. 8, bearing sections 41d each having a hole through which a shaft section 44 can be inserted are provided in wall portions that rise up from either end portion of the locking piece pressing section 41a in the front/rear direction. A shaft section 44 inserted through the holes of the bearing sections 41d is also inserted into the front/rear wall sections of the operating member supporting member 20. The locking piece operating member 41 is rotatable with respect to the upper wall 23 of the upper rail 2 due to being supported by the shaft section 44 which extends in the front/rear direction. Therefore, the locking piece pressing section 41a, the pressed operating section 41b and the engaging piece 41c are able to rotate respectively (in the vertical direction) about a horizontal axis.

The locking piece pressing section 41a of the locking piece operating member 41 is positioned below the operated sections 32 of the respective locking pieces 3a to 3e when in a virtually horizontal state as shown in FIG. 6, while being supported by the upper rail 2. Furthermore, in this state, the pressed operating section 41b and the engaging piece 41c protrude to the right-hand side of the upper rail 2.

When the pressed operating section 41b is pressed downwards, the locking piece pressing section 41a rotates about the shaft section 44 in such a manner that the end opposite to the pressed operating section 41b rises. Due to this rotation, the locking piece pressing section 41a raises each of the locking pieces 3a to 3e upwards by pressing up the operated sections 32 of the respective locking pieces 3a to 3e.

One end of the operating member biasing spring 40 engages with the operating member supporting member 20, and the other end of the operating member biasing spring 40 is attached to a portion of the locking piece pressing section 41a on the side of the pressed operating section 41b with respect to the bearing section 41d.

The locking piece operating member 41 is forced in the counter-clockwise direction in FIG. 6 by the biasing force of the operating member biasing spring 40. The front ends of the pressed operating section 41b and the engaging piece 41c are urged upwards at all times, while the locking piece pressing section 41a is urged downwards at all times.

In the present embodiment, as shown in FIG. 1 and FIG. 2, the operating body 42 is constituted by a round bar member which is bent in an approximate U shape (In FIG. 1 and FIG. 2, the left-hand half only is depicted, in the form of an L shape).

The operating body 42 includes an operation gripping section 42a which is positioned on the front end thereof, and the operating body 42 also includes pressing sections 42b positioned respectively on the left and right-hand rear ends thereof, which press the pressed operating sections 41b of the locking piece operating members 41 of the left-hand sliding section 10a and the right-hand sliding section.

The operation gripping section 42a is disposed below the seat on the front end side of the seat, which is not illustrated. Consequently, a person sitting on the seat is able to grip and operate the operation gripping section 42a while seated. On the other hand, as shown in FIG. 6, the pressing section 42b is positioned above the pressed operating section 41b and lies in a state of substantial contact with the pressed operating section 41b.

In this embodiment, the operating body 42 is able to rotate about the shaft 43. More specifically, the shaft 43 is fixed to the seat and the central portion of the operating body 42 between the operation gripping section 42a and the pressing section 42b is able to rotate about this shaft 43. Accordingly, when the operation gripping section 42a is pushed up by the person in the seat, the pressing section 42b moved downwards and the pressed operating section 41b can be pressed downwards.

The operation gripping section 42a of the operating body 42 in this embodiment is biased downwards by an operating body biasing spring, which is not illustrated. When the operation gripping section 42a is released from the person's hand, after having been pulled up, the operation gripping section 42a returns to the original state shown in FIG. 3, due to the biasing force of the operating body biasing spring.

Next, the lock inhibiting section will be described.

In this embodiment, a first lock inhibiting section 5a (see FIG. 6) is provided as a lock inhibiting section. As shown in FIG. 7, the first lock inhibiting section 5a prevents the forwardmost locking hole 15a from locking with any of the locking pieces 3a to 3e when the rearwardmost locking piece 3e which is located in the rearwardmost position is situated in a forward region A1 which is forward of a lockable position A where the rearwardmost locking piece 3e coincides with the locking hole 14a positioned (adjacently) to the rear side of the forwardmost locking hole 15a located in the forwardmost position (namely, the second locking hole from the front, which is called the "second-to-front intermediate locking hole 14a" below) (in other words, when the rearwardmost locking piece 3e is in a position to the forward side of the front wall of the second-to-front intermediate locking hole 14a).

The first lock inhibiting section 5a has a first pressing state maintaining member 50a which maintains a state where the locking piece pressing section 41a presses the operated sections 32, when the rearwardmost locking piece 3e is in the forward region A1.

Figure 9:
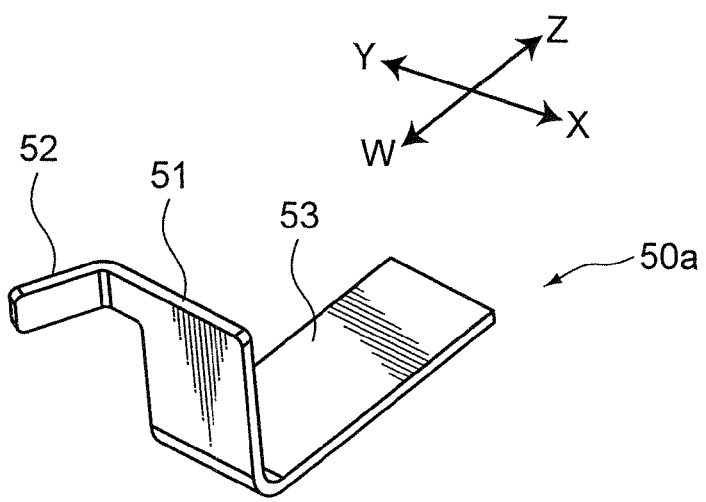
FIG. 9 is a perspective diagram of a first pressing state maintaining member.
Figure 10:
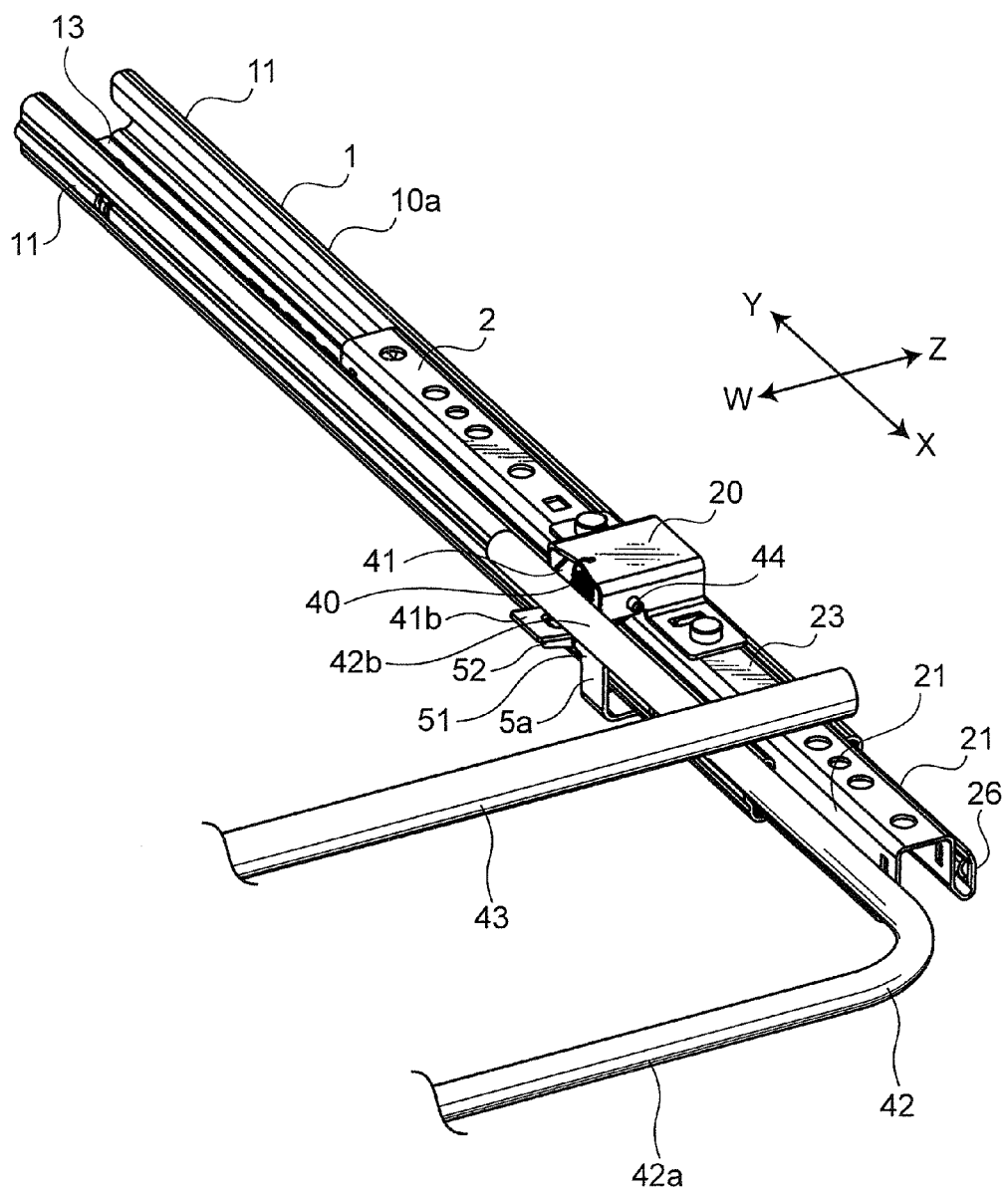
FIG. 10 is a perspective diagram of the left-hand part of a slide locking apparatus for an automobile seat in a state where the rearwardmost locking piece has entered into a forward region.
Figure 11:
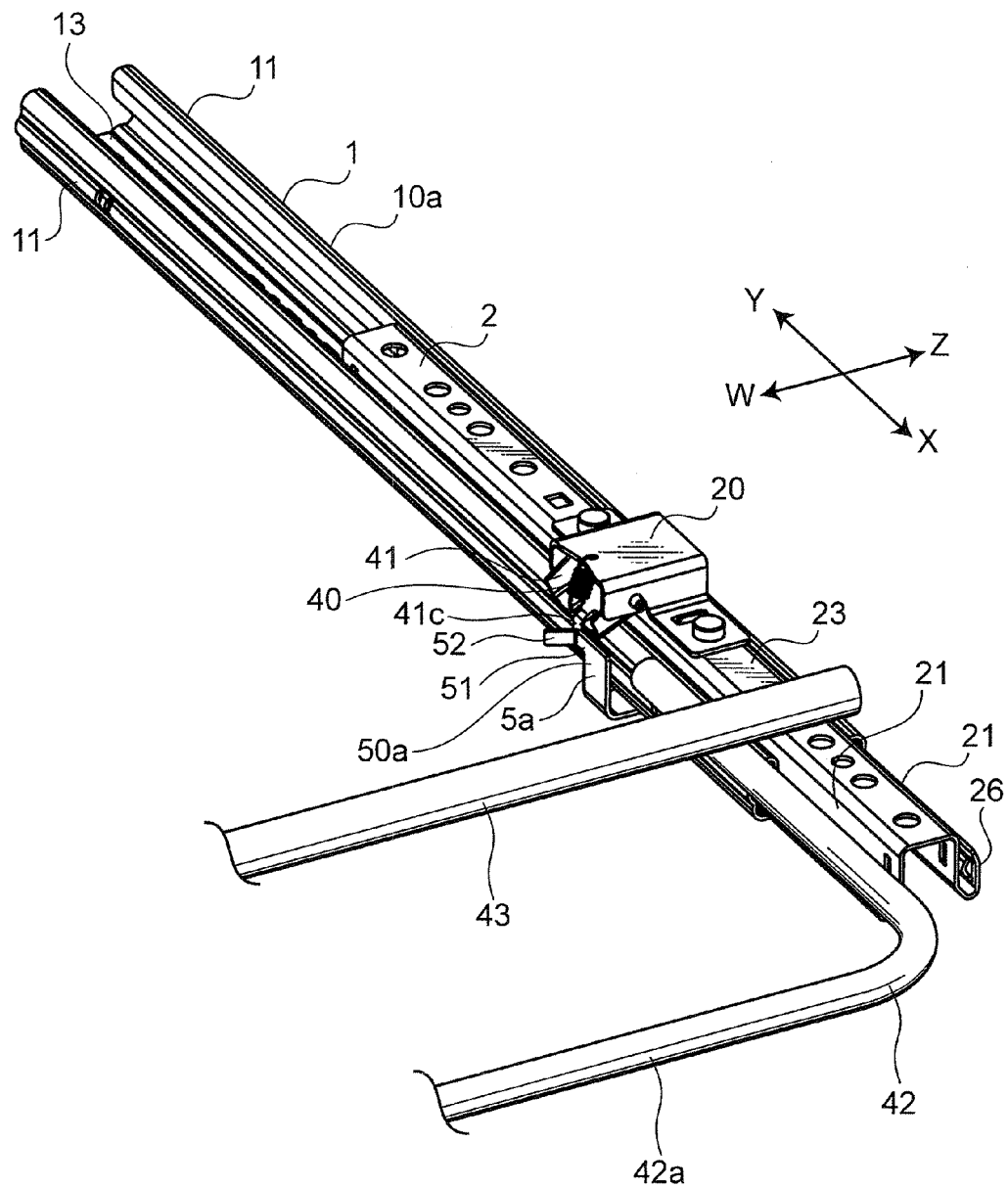
FIG. 11 is a perspective diagram showing the slide locking apparatus for an automobile seat in the state in FIG. 10, omitting a portion of the operating body.

As shown in FIG. 9, the first pressing state maintaining member 50a includes a first engaging section 51 which is capable of engaging with the engaging piece 41c of the locking piece operating member 41, a first guide piece 52 which serves as a first guide section for guiding the engaging piece 41c to the first engaging section 51, and an installation section 53 for attaching the first pressing state maintaining member 50a to the lower rail 1.

The first engaging section 51 is constituted by a plate-shaped body and is integrally formed with the first guide piece 52 and the attachment section 53.

The attachment section 53 is fixed to the lower surface of the lower rail 1 by a fixing means such as welding. As shown in FIG. 7, the installation position of the attachment section 53 on the lower rail 1 is in the vicinity of the forwardmost locking hole 15a in the lower rail 1 and at a forward position of the forwardmost locking hole 15a.

As shown in FIG. 5 and FIG. 6, in a state where the attachment section 53 is mounted on the lower rail 1, the first engaging section 51 is disposed substantially in parallel with the side wall 11 of the lower rail 1. In this state, a gap 6 is formed between the first engaging section 51 and the side wall 11 of the lower rail 1, into which the engaging piece 41c enters when the rearwardmost locking piece 3e is in the forward region A1. The rear end of the upper end portion of the first engaging piece 51 extends in the rearward direction so as to be positioned at a rear position of the rear end of the attachment section 53. The first engaging piece 51 is disposed at the position where the engaging piece 41c is located when the rearwardmost locking piece 3e has entered into the forward region A1. In other words, the first engaging piece 51 is positioned to the side (in the vehicle width direction) of the position of the engaging piece 41c in this state.

When the attachment section 53 is attached to the lower rail 1, the first guide piece 52 extends diagonally rearwards from the rear end of the first engaging section 51 so as to form a gradually widening gap between the side wall 11 of the lower rail 1 and the first guide piece 52, as shown in FIG. 5. In this embodiment, the angle formed between the first guide piece 52 and the side wall 11 of the lower rail 1 is set to be 60° to 70°.

Next, the operation of the slide locking apparatus for an automobile seat according to the present embodiment will be described. For the sake of this description, it is supposed that the locking pieces 3b, 3c, 3e have been inserted into locking holes 14a, 15a of the lower rail 1, in other words, are in a locked state (the state shown in FIG. 6 and FIG. 7).

Figure 13:
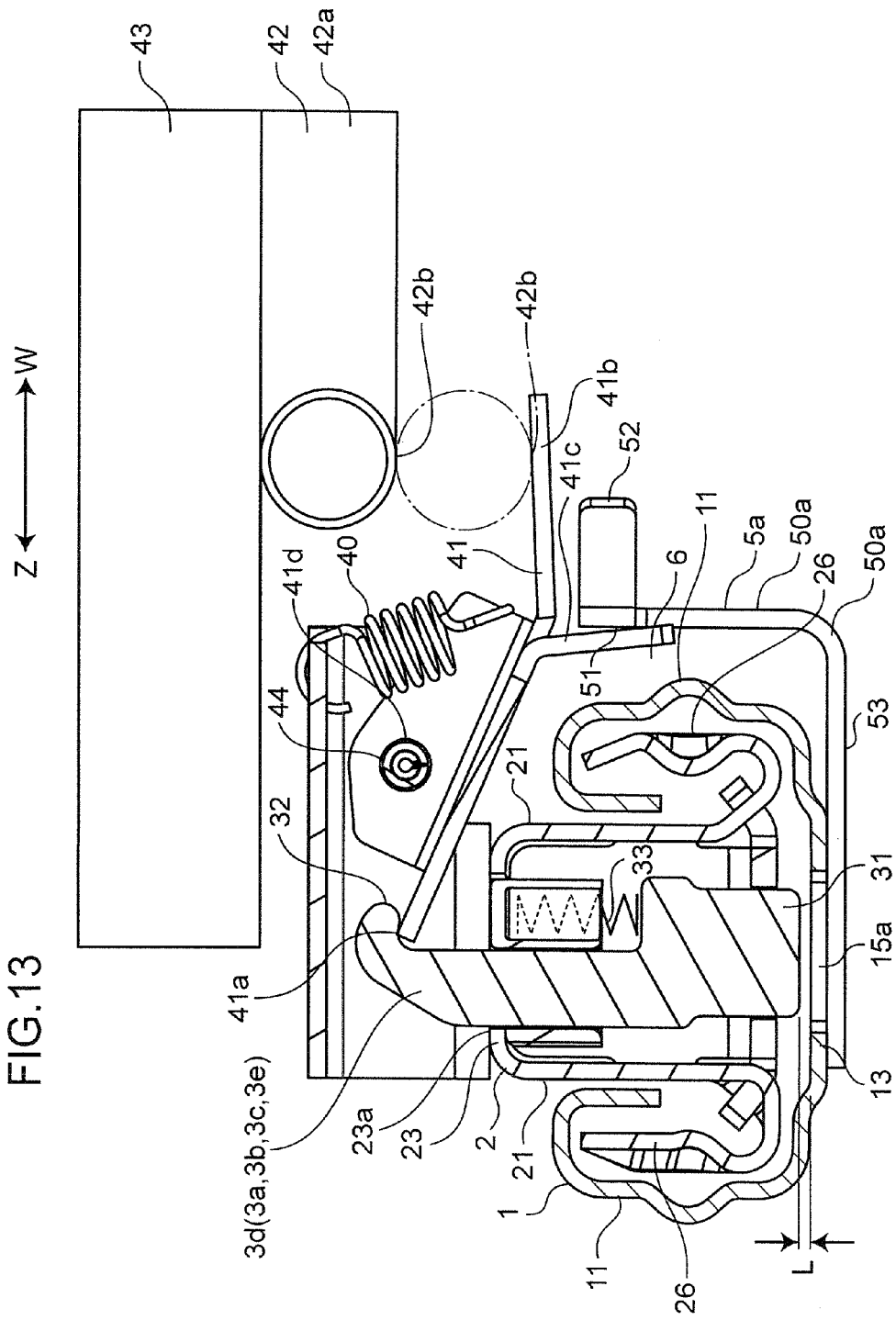
FIG. 13 is an enlarged cross-sectional diagram along line XIII-XIII in FIG. 12.

In a case where the slide locking apparatus is in a locked state, if the seated person performs an operation of pulling up the operation gripping section 42a of the operating body 42, then as indicated by the single-dotted line in FIG. 13, the pressed operating section 41b is pressed downwards by the pressing section 42b.

Consequently, the locking piece pressing section 41a abuts against the operated sections 32 of all of the locking pieces 3a to 3e, and the locking piece pressing section 41a pushes all of the locking pieces 3a to 3e against the biasing force of the coil spring 33. Therefore, the locking hook sections 31 of all of the locking pieces 3a to 3e come out of the locking holes 14 to 15b, and the lower ends of the locking pieces 3a to 3e are raised by a certain distance L from the bottom wall 13 of the lower rail 1.

In this case, the engaging piece 41c of the locking piece operating member 41 is situated to the inner side (the inner side in the left/right direction, the inner side in the vehicle width direction) of the first engaging section 51. In other words, the engaging piece 41c is situated closer to the side of the side wall 11 of the lower rail 1 than the first engaging section 51 (see FIG. 12 and FIG. 13).

Therefore, the upper rail 2 becomes slidable with respect to the lower rail 1. Consequently, when the seat is pushed forward by the seated person, for example, the upper rail 2 slides forward with respect to the lower rail 1 and the seat moves forward.

Figure 12:
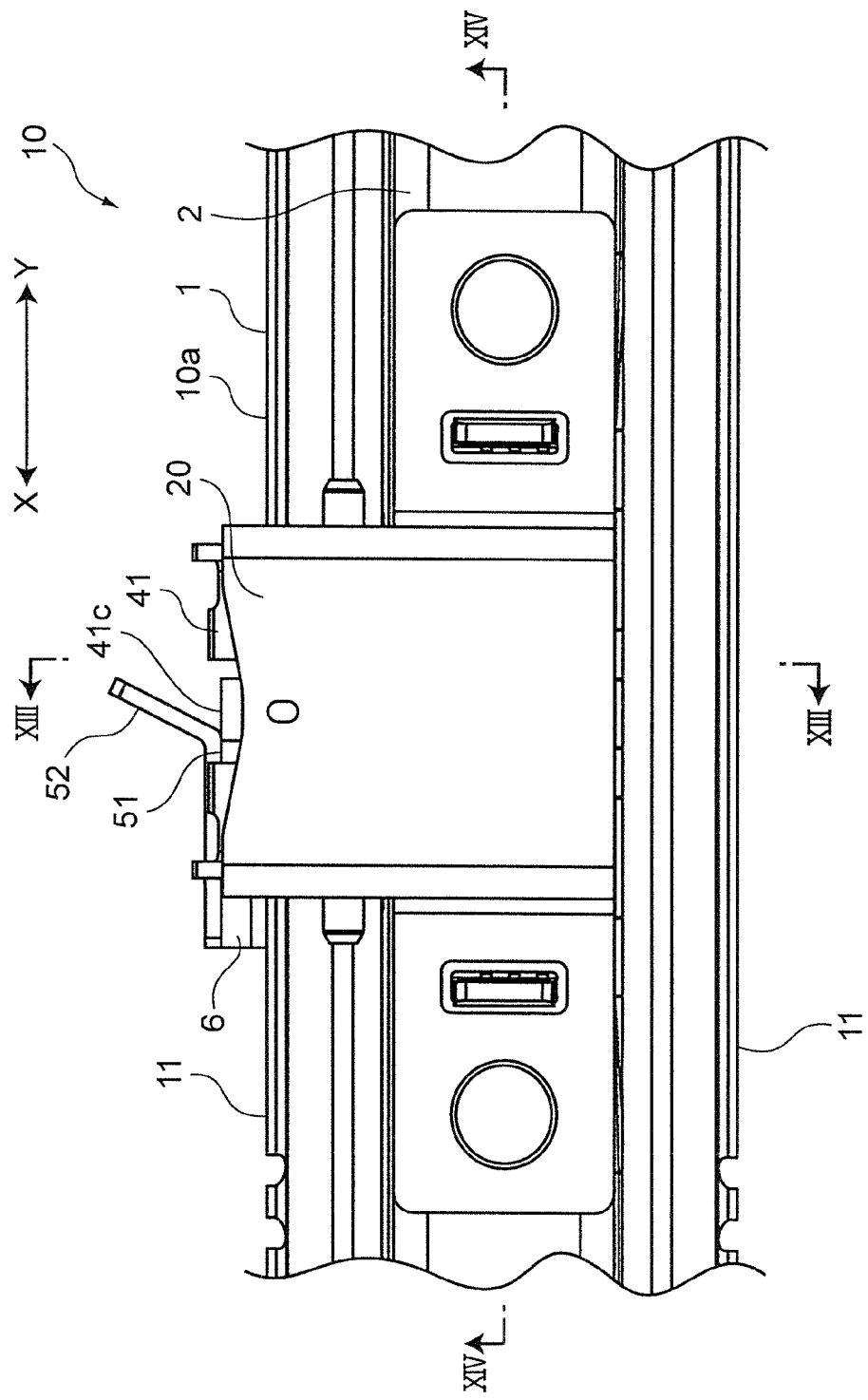
FIG. 12 is an enlarged plan diagram of the principal part of a slide locking apparatus for an automobile seat in the state in FIG. 10.
Figure 14:
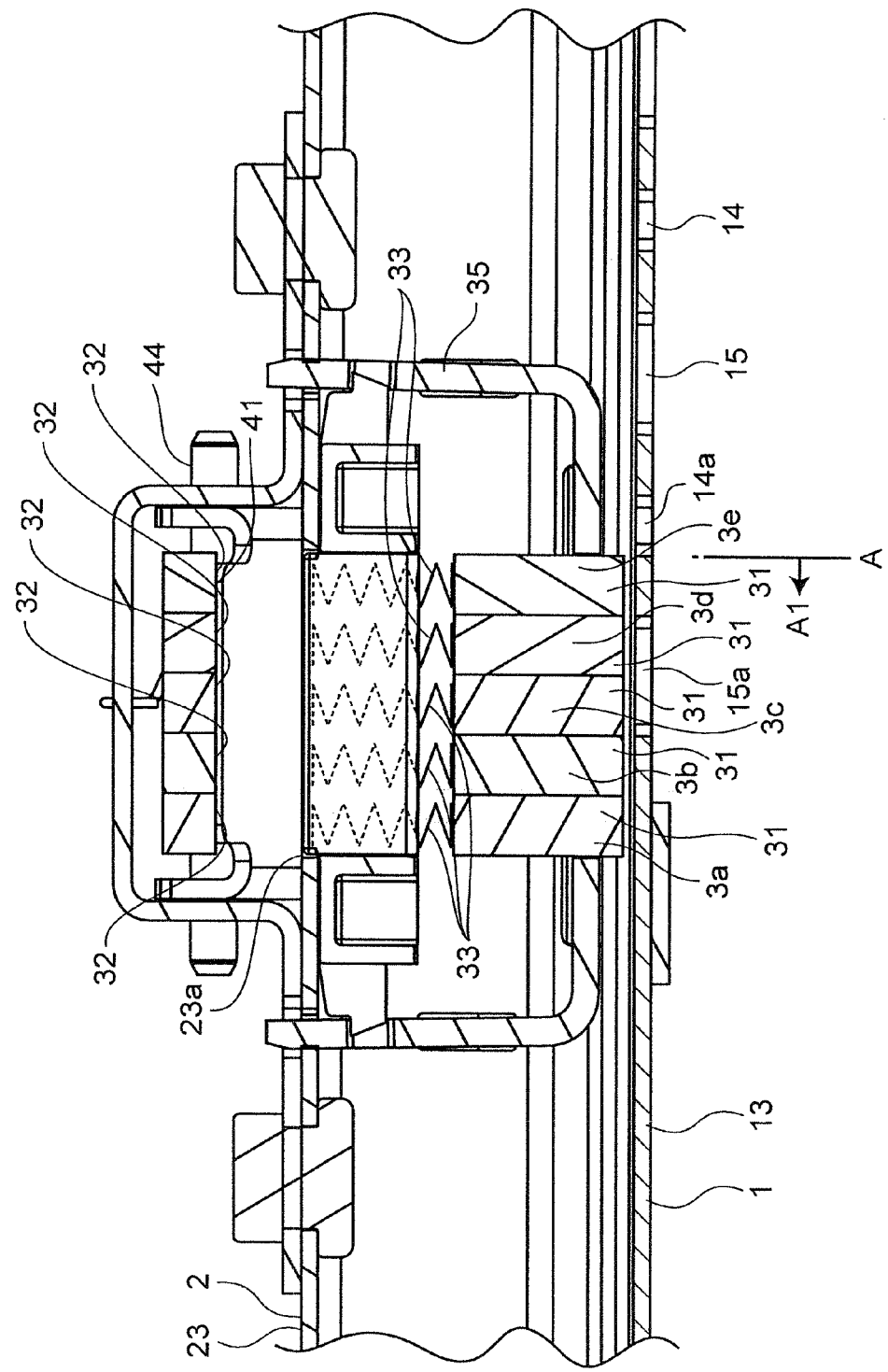
FIG. 14 is an enlarged cross-sectional diagram along line XIV-XIV in FIG. 12.

When the rearwardmost locking piece 3e enters into the forward region A1 as shown in FIG. 14, for example, the engaging piece 41c of the locking piece operating member 41 enters into the gap 6 between the first engaging section 51 and the side wall 11 of the lower rail 1, as shown in FIG. 12.

When the person releases the operation gripping section 42a of the operating body 42 in this state, then as shown in FIG. 13, the operation gripping section 42a returns to its original position due to the biasing force of the operating body biasing spring, which is not illustrated.

On the other hand, when the pressure from the operating body 42 is released, the locking piece operating member 41 seeks to rotate in the counter-clockwise direction in FIG. 13 due to the biasing force of the operating member biasing spring 40, but because the engaging piece 41c of the locking piece operating member 41 engages with the first engaging section 51, the locking piece operating member 41 is in a non-rotatable state.

Consequently, the locking piece pressing section 41a of the locking piece operating member 41 maintains the operated sections 32 of the locking pieces 3a to 3e in a upward pressed state against the biasing force of the coil spring 33. Therefore, a state is maintained where the lower ends of the locking pieces 3a to 3e are raised approximately by the distance L from the bottom wall 13 of the lower rail 1. In this case, the pressing section 42b is separated from the pressed operating section 41b.

Consequently, the locking pieces 3a to 3e are maintained in a pushed up state, as shown in FIG. 14, and even if the locking pieces 3c and 3d coincide with the forwardmost locking hole 15a, these locking pieces 3c, 3d are not able to enter into the forwardmost locking hole 15a. More specifically, an unlocked state is maintained.

If the operation gripping section 42a of the operating body 42 has not been pushed up sufficiently when sliding the seat, and if the lower ends of the locking pieces 3a to 3e are sliding over the upper surface of the lower wall 13 of the lower rail 1, then the seat is slidable. In this case, the position of the engaging piece 41c of the locking piece operating member 41 in the left/right direction (vehicle width direction) may be substantially the same as the position of the first engaging section 51 in the left/right direction. In this event, the engaging piece 41c is situated in a position forward of the first engaging section 51, and the engaging piece 41c is guided to the inner side of the first engaging section 51 by the first guide piece 52 and enters into the gap 6. Consequently, a state is achieved in which the lower ends of the locking pieces 3a to 3e are raised approximately by the distance L from the bottom wall 13 of the lower rail 1.

Therefore, it is possible to engage the engaging piece 41c with the first engaging section 51 in a simple and reliable fashion. More specifically, by means of the first guide piece 52, it is possible to prevent the engaging piece 41c from failing to enter into the gap 6 due to the engaging piece 41c abutting against the first engaging section 51.

Furthermore, when the upper rail 2 slides forwards with respect to the lower rail 1 due to the seat being pushed forwards, then even if, for example, the rearwardmost locking piece 3e is moved to a forward position of the forwardmost locking hole 15a, the engaged state of the engaging piece 41c and the first engaging section 51 is maintained because the engaging piece 41c slides over the first engaging section 51.

Furthermore, in an engaged state where the engaging piece 41c is engaged with the first engaging section 51, the lower ends of the locking pieces 3a to 3e are raised by a distance L from the bottom wall 13 of the lower rail 1. Consequently, it is possible to move the seat smoothly without sliding resistance between the locking pieces 3a to 3e and the lower rail 1.

On the other hand, to move the seat rearwards after being situated in a forward position, the seat is pushed in a rearward direction. Accordingly, the seat can be moved rearwards. In this case, if the rearwardmost locking piece 3e does not leave the forward region A1, then the engaging piece 41c of the locking piece operating member 41 is maintained in a state of engagement with the first engaging section 51. Therefore, even if the rearwardmost locking piece 3e coincides with the position of the forwardmost locking hole 15a, or the like, the locking piece 3e does not enter into the locking hole 15a, or the like.

Consequently, it is possible to prevent the seat from locking in a state where locking pieces 3a to 3e have entered into the forwardmost locking holes 15a only. Therefore, it is possible to prevent the force from the seat being applied only to the inner walls of the forwardmost locking hole 15a. As a result of this, it is possible to prevent damage being caused to the inner walls of the forwardmost locking hole 15a.

If the rearwardmost locking piece 3e leaves the forward region A1 and moves to a rear position of the region A1, then when the locking pieces 3a to 3e coincide with the position of a locking hole 14 to 15b, they enter into the locking hole 14 to 15b due to the biasing force of the coil springs 33. In this case, the locking pieces 3a to 3e enter simultaneously into two or more locking holes 14 to 15b and assume a locked state.

As shown in FIG. 7, for example, if the rearwardmost locking piece 3e coincides with the second-to-front intermediate locking hole 14a, then the other locking pieces 3b and 3c coincide with the forwardmost locking hole 15a. Therefore, the locking pieces 3b and 3c enter into the forwardmost locking hole 15a simultaneously with the rearwardmost locking piece 3e entering into the second-to-front intermediate locking hole 14a. Therefore, three locking pieces 3b, 3c and 3e are inserted simultaneously into locking holes 15a and 14a, and a locked state is achieved in which relative movement of the upper rail 2 with respect to the lower rail 1 is impossible.

As described above, the slide locking apparatus for a seat according to the present embodiment includes a first locking section which is provided on one of a lower rail and an upper rail which can move in a front/rear direction following the lengthwise direction of the lower rail, and a plurality of second locking sections, provided on the other of the lower rail and the upper rail, which can lock with and unlock from the first locking section. The first locking section includes a plurality of locking pieces aligned in the lengthwise direction on one of the lower rail and the upper rail. The plurality of second locking sections are aligned in the lengthwise direction on the other of the lower rail and the upper rail and constitute at least one second locking section group. The second locking section group is configured in such a manner that, when at least one of the plurality of locking pieces locks with one of a forwardmost second locking section disposed in a forwardmost position, a rearwardmost second locking section disposed in a rearwardmost position, and an intermediate second locking section disposed between the forwardmost and rearwardmost second locking sections, another locking piece of the plurality of locking pieces can lock in a substantially simultaneous fashion with another second locking section of the second locking section group. The slide locking apparatus for a seat further includes: at least one of a first lock inhibiting section which inhibits the forwardmost second locking section from locking with any of the locking pieces if the rearwardmost locking piece of the plurality of locking pieces has entered into a region at a forward position of a lockable position where the rearwardmost locking piece coincides with an intermediate second locking section that is adjacent to the forwardmost second locking section of the second locking section group, and a second lock inhibiting section which inhibits the rearwardmost second locking section from locking with any of the locking pieces if the forwardmost locking piece of the locking pieces has entered into a region at a rearward position of a lockable position where the forwardmost locking piece coincides with the intermediate second locking section that is adjacent to the rearwardmost second locking section of the second locking section group.

In the slide locking apparatus having a constitution mentioned above, even if the seat has been moved forwards until the rearwardmost locking piece is positioned to the forward side of the forwardmost second locking section, with the locking pieces in an unlocked state with respect to the second locking sections, for example, and the seat is then moved rearwards, the forwardmost second locking section does not lock with any of the locking pieces until the rearwardmost locking piece coincides with the position of an intermediate second locking section that is adjacent to the rear side of the forwardmost second locking section.

Consequently, it is ensured that, when the apparatus is locked, in addition to the intermediate second locking section adjacent to the rear side of the forwardmost second locking section locking with the rearwardmost locking piece, the forwardmost second locking section is always in a locked state with another locking piece. In other words, it is possible to insert a plurality of locking pieces simultaneously into the second locking sections at all times. Consequently, a situation never arises where some locking pieces are locked with the only forwardmost second locking section.

On the other hand, if the seat has been moved rearwards, then when locking is applied, it is ensured that, in addition to the intermediate second locking section adjacent to the front side of the rearwardmost second locking section locks with the forwardmost locking piece, the rearwardmost second locking section is always in a locked state with another locking piece. Consequently, a situation never arises where some locking pieces are locked with the only rearwardmost second locking section.

Therefore, herefore, when locking is applied, it is possible to lock the locking pieces and second locking sections in at least two positions, and the force received from the seat can be distributed between at least two positions. Consequently, the risk of breakage or damage to the locking pieces or breakage or damage to the side faces of the second locking sections can be reduced, and it is possible to improve the durability of the locking pieces and the wall faces of the second locking sections.

Here, the plurality of locking pieces is held respectively in a vertically movable fashion on one of the lower rail and the upper rail. The slide locking apparatus for a seat may further include a locking piece biasing member which urges the plurality of locking pieces towards the second locking sections, and a locking piece pressing section which presses locking pieces locked by the second locking sections so as to be unlockable against the biasing force of the locking piece biasing member. In this case, the first lock inhibiting section may include a first pressing state maintaining member which maintains the locking piece pressing section in the unlocked state if the rearwardmost locking piece has entered into a region at a forward position of the lockable position; and the second lock inhibiting section may include a second pressing state maintaining member which maintains the locking piece pressing section in the unlocked state if the forwardmost locking piece has entered into a region at a rearward position of the lockable position. In so doing, the composition can be simplified.

Furthermore, the slide locking apparatus for a seat may further include an engaging piece which engages in a disengageable fashion with the pressing state maintaining member. In this case, the engaging piece can be coupled with the locking piece pressing section. The first pressing state maintaining member may include a first engaging section which engages with the engaging piece when the locking piece pressing section is in the unlocked state and a first guide section which guides the engaging piece to the first engaging section when the rearwardmost locking piece enters into a region forward of the lockable position. Furthermore, the second pressing state maintaining member may include a second engaging section which engages with the engaging piece when the locking piece pressing section is in the unlocked state and a second guide section which guides the engaging piece to the second engaging section when the forwardmost locking piece enters into a region rearward of the lockable position.

By adopting a configuration of this kind, it is possible to guide the engaging piece to the first engaging section by the first guide section and the engaging piece can be caused to engage readily and reliably with the first engaging section. Furthermore, by adopting a configuration of this kind, it is possible to guide the engaging piece to the second engaging section by the second guide section and the engaging piece can be caused to engage readily and reliably with the second engaging section.

Figure 15:
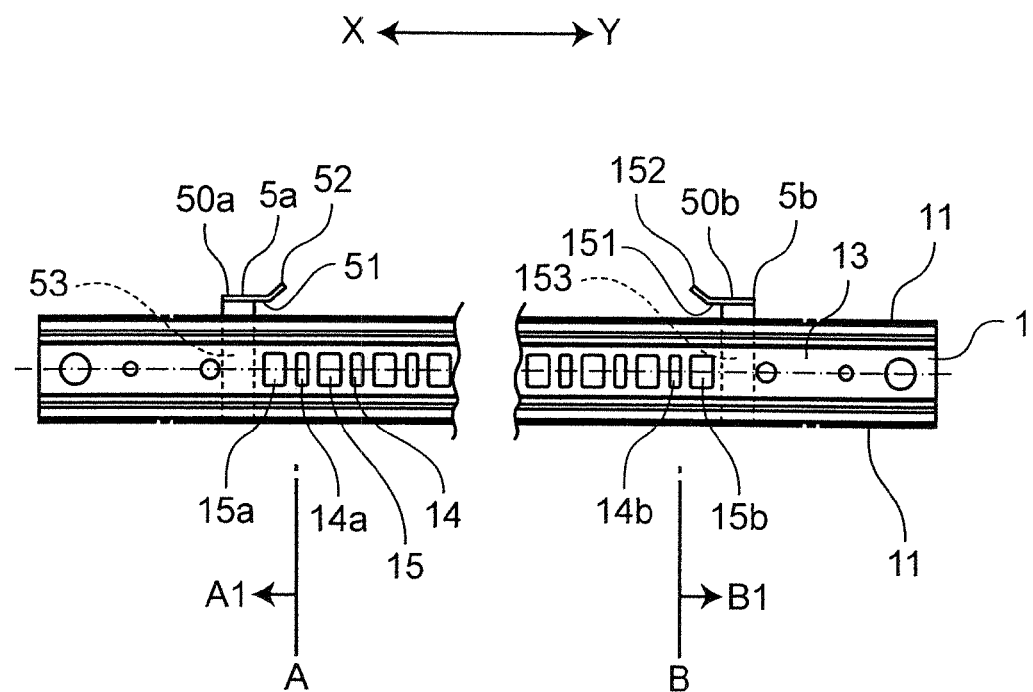
FIG. 15 is an illustrative diagram of a further embodiment of an slide locking apparatus for an automobile seat.

The slide locking apparatus according to the present embodiment includes a first lock inhibiting section $5a$, but is not limited to this mode. For example, it is also possible to adopt a configuration where a first lock inhibiting section $5a$ and a second lock inhibiting section $5b$ are provided as shown in FIG. 15, instead of a configuration where only a first lock inhibiting section $5a$ is provided. The second lock inhibiting section $5b$ inhibits the rearward locking hole $15b$ from locking with any of the locking pieces $3a$ to $3e$ if the forwardmost locking piece $3a$ (see FIG. 14) has entered a rearward region B1 to the rearward side of a lockable position B where the forwardmost locking piece $3a$ coincides with a locking hole $14b$ that is adjacent to the front side of the rearwardmost locking hole $15b$ (the second locking hole from the rear, hereinafter, called the second-to-rear intermediate locking hole $14b$) (in other words, where the rear face of the forwardmost locking piece $3a$ is to the rear side of the rear wall of the second-to-rear intermediate locking hole $14b$). A configuration may also be adopted in which the second lock inhibiting section $5b$ is provided and the first lock inhibiting section $5a$ is not provided.

The second lock inhibiting section $5b$ may include a second pressing state maintaining member $50b$ having a second engaging section 151, a second guide piece 152 and an attachment section 153. The second engaging section 151, the second guide piece 152 and the attachment section 153 have symmetrical shapes with respect to the first pressing state maintaining member $50a$ of the first lock inhibiting section $5a$, in the front/rear direction. The second pressing state maintaining member $50b$ is disposed in a symmetrical position with respect to the first pressing state maintaining member $50a$, in the front/rear direction. When the forwardmost locking piece $3a$ enters into the rearward region B1, the second guide piece 152 guides the engaging piece $41c$ to the inner side of the second engaging section 151.

In the present embodiment, a lower rail 1 including one second locking section group is used, but it is also possible to use a lower rail 1 including two or more second locking section groups $16a$ and $16b$.

Figure 16:
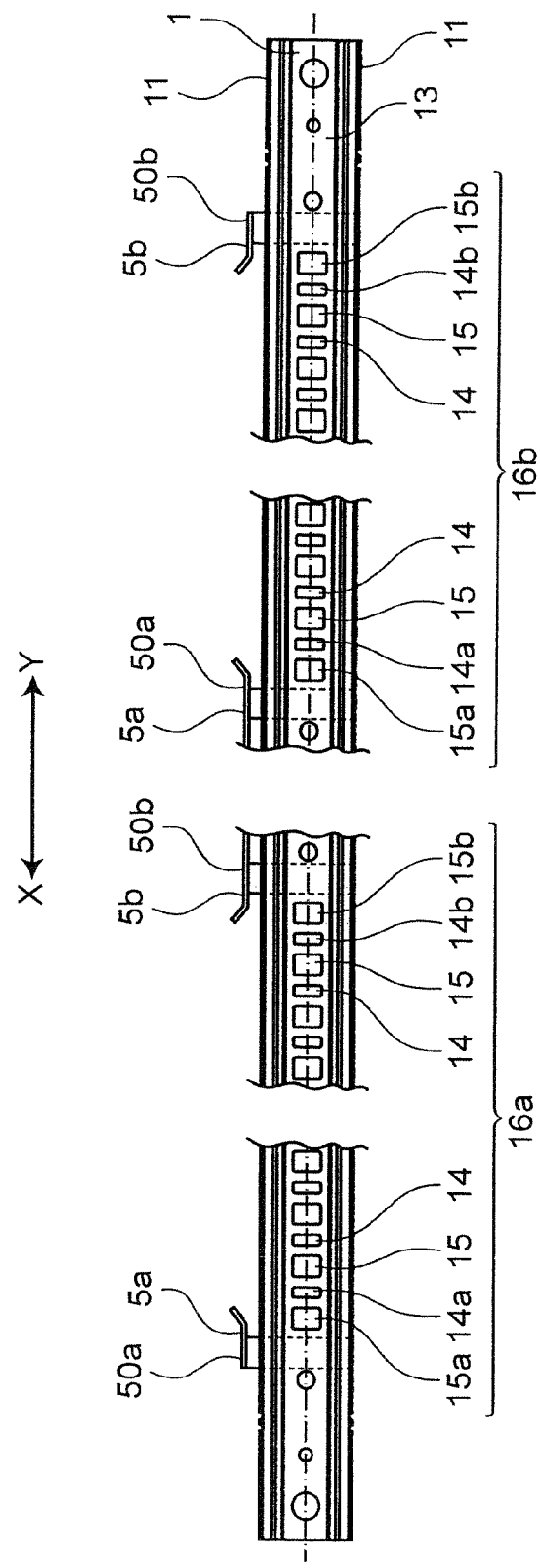
FIG. 16 is an illustrative diagram of yet a further embodiment of an slide locking apparatus for an automobile seat.
Figure 17:
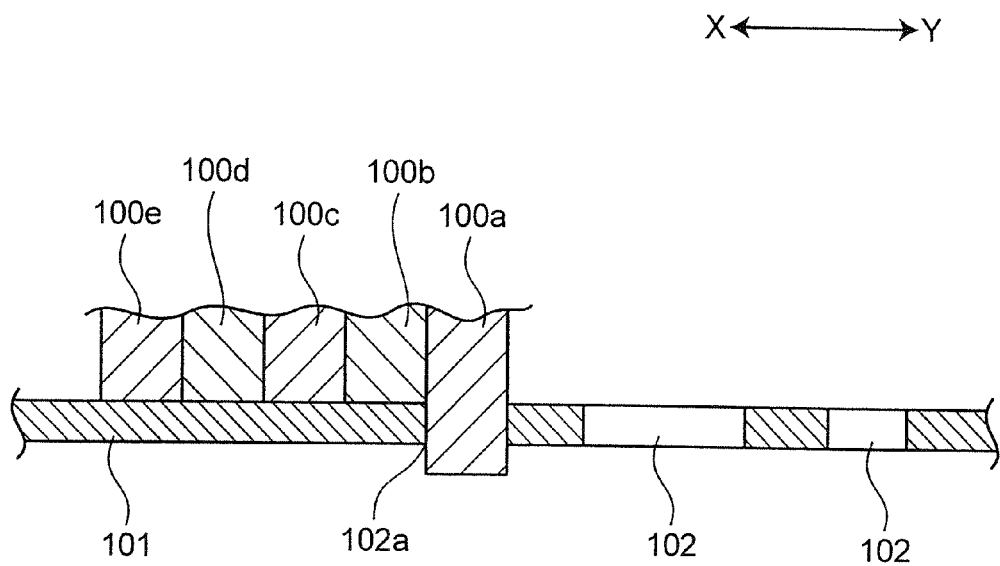
FIG. 17 is a diagram for describing the movement of locking pieces in an slide locking apparatus of a comparative example.

More specifically, as shown in FIG. 16, for example, a first locking section group $16a$ consisting of a plurality of locking holes 14 to $15b$ and a second locking section group $16b$ consisting of a plurality of locking holes 14 to $15b$, arranged at a position apart rearward from the first locking section group $16a$ in a certain distance, are provided.

A first lock inhibiting section $5a$ having a first pressing state maintaining member $50a$ is provided at a forward position of the first locking section group $16a$, and a second lock inhibiting section $5b$ having a second pressing state maintaining member $50b$ is provided at a rear position of the of the second locking section group $16b$, and furthermore a first lock inhibiting section $5a$ having a first pressing state maintaining member $50a$ and a second lock inhibiting section $5b$ having a second pressing state maintaining member $50b$ may be provided in a consecutive fashion in the portion from the rear side of the first locking section group $16a$ to the forward side of the second lock inhibiting section $5b$.

In the embodiment described above, the first lock inhibiting section 5a prevents any of the locking pieces 3a to 3e from locking with the forwardmost locking hole 15a, if the rearwardmost locking piece 3e has entered into a region at forward position of the second-to-front intermediate locking hole 14a of the second locking section group, but the invention is not limited to this mode and can be modified suitably.

For example, the first lock inhibiting section 5a may prevent any of the locking pieces 3a to 3e from locking with the forwardmost locking hole 15a and the second-to-front locking hole 14a if the rearwardmost locking piece 3e has entered into a region at a forward position of the locking hole 15 which is adjacent to the rear side of the second-to-front intermediate locking hole 14a in the second locking section group (in other words, a region at a forward position of the third intermediate locking hole from the front).

In a similar fashion, the second lock inhibiting section 5b may prevent any of the locking pieces 3a to 3e from locking with the rearwardmost locking hole 15b and the second-to-rear intermediate locking hole 14b if the forwardmost locking piece 3a has entered into a region at a rearward position of the locking hole 15 which is adjacent to the forward side of the second-to-rear intermediate locking hole 14b in the second locking section group (in other words, a region at a rearward position of the third intermediate locking hole from the rear).

Furthermore, in the present embodiment, the second locking sections are constituted by locking holes, but suitable modifications can be made and the second locking sections may be constituted by concave-shaped locking recesses.

Furthermore, in the embodiment described above, the plurality of locking holes 14 to 15b include locking holes of two types, namely, small locking holes 14, 14a, 14b and large locking holes 15, 15a, 15b, but it is also possible to adopt a configuration in which there is only one type of locking hole, such as the small locking holes 14, 14a, 14b, for example.

Moreover, in the present embodiment, there are five locking pieces 3a to 3e, but the invention is not limited to this and can be modified suitably, and three or more locking pieces may be provided.

Furthermore, in the embodiment described above, the pressing state maintaining members 50a and 50b include guide pieces 52 and 152, but the invention is not limited to this and can be modified suitably; for instance, a configuration which omits the guide pieces 52 and 152 is possible.

Furthermore, in the present embodiment, the locking holes 14 to 15b are formed in the lower rail 1 and the locking pieces 3a to 3e are held on the upper rail 2, but it is also possible to adopt a configuration in which the locking holes 14 to 15b are formed in the upper rail 2 and the locking pieces 3a to 3e are held on the lower rail 1, and further suitable modifications are possible.

This application is based on Japanese Patent Application No. 2010-074404 filed on Mar. 29, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A slide locking apparatus for a seat, comprising:
a first locking section provided on one of a lower rail and an upper rail which can be moved in a front/rear direction following a lengthwise direction of the lower rail; and
a plurality of second locking sections, which are provided on the other one of the lower rail and the upper rail, so as to be able to lock with and unlock from the first locking section, wherein the first locking section has a plurality of locking pieces aligned in the lengthwise direction on one of the lower rail and the upper rail,
the plurality of second locking sections are aligned in the lengthwise direction on the other one of the lower rail and the upper rail and constitute at least one second locking section group, and
the second locking section group is configured such that, when at least one of the plurality of locking pieces locks with one of a forwardmost second locking section disposed in a forwardmost position, a rearwardmost second locking section disposed in a rearwardmost position, and an intermediate second locking section disposed between the forwardmost and rearwardmost second locking sections, another locking piece of the plurality of locking pieces can lock substantially simultaneously with another second locking section of the second locking section group,
the slide locking apparatus for a seat further having:
a locking piece biasing member that respectively urges the plurality of locking pieces toward the second locking sections; and
a locking piece operating member supported by a shaft section extended in the front/rear direction and having a locking piece pressing section and an engaging piece, the locking piece pressing section being capable of pressing locking pieces locked by the second locking sections so as to enable unlocking against a biasing force of the locking piece biasing member, the engaging piece being in an interlocking relationship with the locking piece pressing section, and
at least one of a first lock inhibiting section and a second lock inhibiting section, wherein
the first lock inhibiting section has a first pressing state maintaining member that is provided on the other one of the lower rail and the upper rail, the first pressing state maintaining member including a first engaging section adjacent to the forwardmost second locking section in a direction perpendicular to the front/rear direction,
the first lock inhibiting section is configured to inhibit the forwardmost second locking section from locking with a locking piece positioned corresponding to a position of the forwardmost second locking section in the direction perpendicular to the front/rear direction by engaging the engaging piece with the first engaging section so that the first pressing state maintaining member maintains the locking piece pressing section in the unlocked state when the rearwardmost locking piece of the plurality of locking pieces is in a region at a forward position of a lockable position where the rearwardmost locking piece coincides with an intermediate second locking section that is adjacent to the forwardmost second locking section of the second locking section group, and
wherein the second lock inhibiting section has a second pressing state maintaining member that is provided on the other one of the lower rail and the upper rail, the second pressing state maintaining member including a second engaging section adjacent to the rearwardmost second locking section in the direction perpendicular to the front/rear direction,
the second lock inhibiting section is configured to inhibit the rearwardmost second locking section from locking with a locking piece positioned corresponding to a position of the rearwardmost second locking section in the direction perpendicular to the front/rear direction by engaging the engaging piece with the second engaging section so that the second pressing state maintaining member maintains the locking pressing piece section in the unlocked state when the forwardmost locking piece of the locking pieces is in a region at a rearward position of a lockable position where the forwardmost locking piece coincides with the intermediate second locking section that is adjacent to the rearwardmost second locking section of the second locking section group.

2. The slide locking apparatus for a seat according to claim 1, wherein the plurality of locking pieces are held to be vertically movable respectively on one of the lower rail and the upper rail.

3. The slide locking apparatus for a seat according to claim 1, wherein the first pressing state maintaining member further has a first guide section which guides the engaging piece to the first engaging section when the rearwardmost locking piece enters into a region at a forward position of the lockable position; and the second pressing state maintaining member further has a second guide section which guides the engaging piece to the second engaging section when the forwardmost locking piece enters into a region at a rearward position of the lockable position.

* * * * *